S. P. HAY.
MILK CONDENSER.
APPLICATION FILED JAN. 2, 1913.

1,067,336.

Patented July 15, 1913.

Witnesses

Soren P. Hay, Inventor
by _____ Attorneys

UNITED STATES PATENT OFFICE.

SOREN P. HAY, OF SPOKANE, WASHINGTON.

MILK-CONDENSER.

1,067,336.  Specification of Letters Patent.  Patented July 15, 1913.

Application filed January 2, 1913. Serial No. 739,864.

*To all whom it may concern:*

Be it known that I, SOREN P. HAY, a citizen of the United States, residing at Spokane, in the county of Spokane and State of Washington, have invented a new and useful Milk-Condenser, of which the following is a specification.

The present invention relates to milk condensers, and is particularly an improvement over the milk condenser disclosed in my former Patent No. 1,042,912 issued October 29, 1912.

The present invention contemplates the production of a milk condenser of the general character of the apparatus disclosed in the above mentioned patent but which shall be more simple, compact and inexpensive in construction, as well as of higher efficiency, and serviceability.

The present invention incorporates the prominent features of the apparatus disclosed in the aforesaid patent, and in addition thereto incorporates certain additional advantages, the cardinal of which is the provision whereby the apparatus may be connected to a tank or other suitable supply of milk and in order that the milk may be automatically supplied to the apparatus as the milk within the apparatus condenses due to the desiccating action.

A further feature, as provided by the present improved apparatus, is the provision of a turbine rotor adapted to be actuated by the steam for heating the milk, in order that the steam or other heated fluid may be employed for actuating the agitator, sprayer and exhaust fan.

With the above and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

The invention has been illustrated in the accompanying drawing, wherein:—

Figure 1:
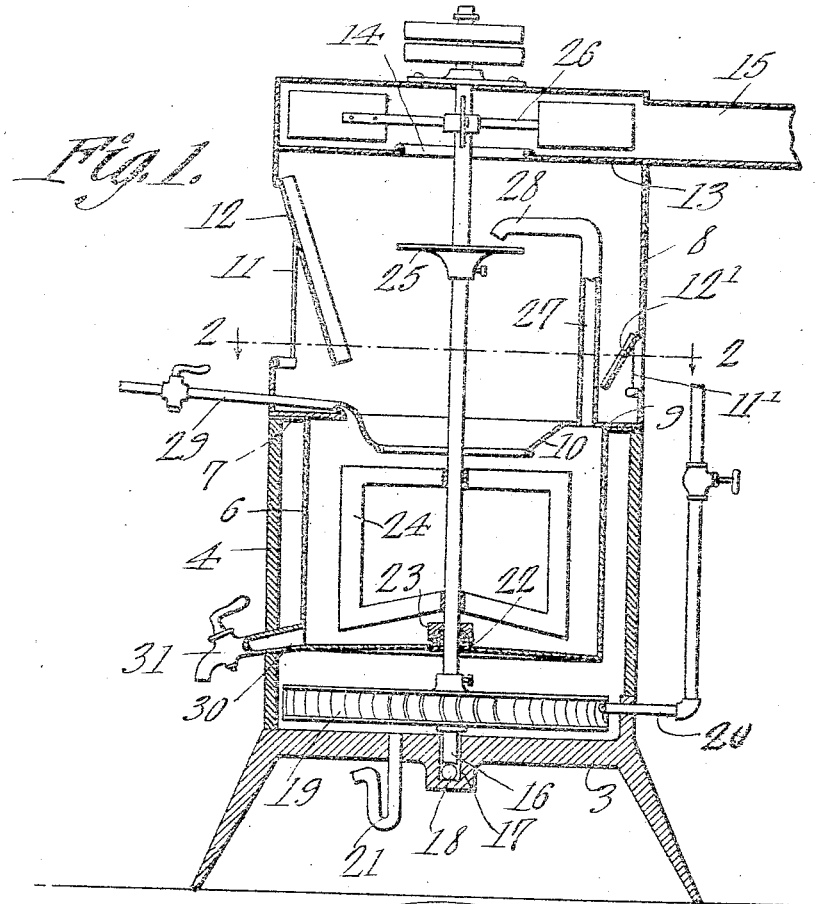
Figure 2:
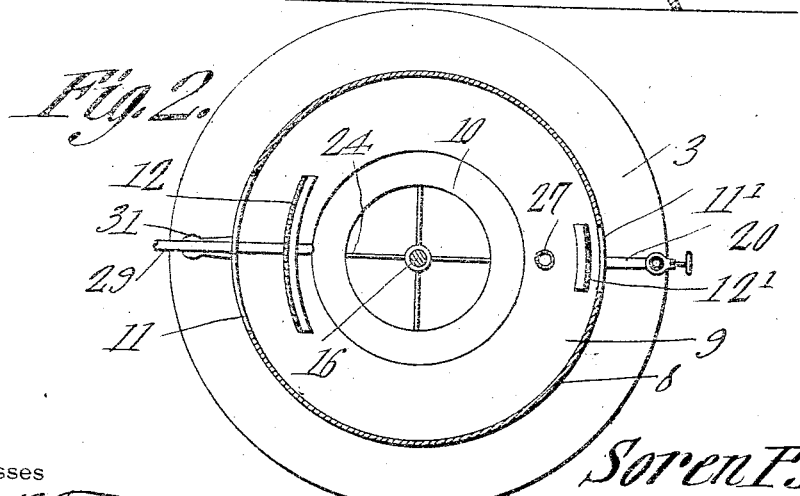

Figure 1 is a vertical central section of the improved apparatus. Fig. 2 is a sectional view taken on the line 2—2 of Fig. 1.

Referring specifically to the drawing, the present apparatus is mounted on a suitable base 3, upon which is mounted an insulating jacket 4, the jacket being constructed of any suitable material, such as a composition containing asbestos or other heat resisting element.

Hung within and enveloped by the jacket 4 is the milk receptacle 6 having the upper or exterior flange 7 seating on the upper end of the jacket, the bottom of the receptacle being spaced from the base 3 and the sides thereof being spaced from and concentric with the jacket.

A superimposed casing 8 has an inwardly projecting flange 9 at its lower end resting on the flange 7 of the milk receptacle, it being understood that the jacket, milk receptacle and casing may be secured together in any desirable manner. The flange 9 overhangs the receptacle 6 and the inner or free edge of the flange is bent downwardly in the form of a funnel as designated by the numeral 10, so that any milk precipitating or gathering on the flange 9 will be directed centrally or axially into the milk receptacle. The casing 8 is provided at one side with a relatively large inlet opening 11, and at its opposite side with a relatively small inlet opening 11', the respective openings being provided with the inwardly disposed aprons or deflectors 12 and 12' secured at the upper ends of the openings. A partition 13 is also provided within the casing 8 adjacent its upper end, the said partition being provided with a central opening 14, and an exhaust conduit 15 being attached to the casing 8 above the said partition.

Arranged axially within the apparatus is the upright or vertical shaft 16, the lower end of which enters the socket 17 provided in the base and rests on an anti-frictional ball 18 within the socket. A turbine rotor 19 is mounted on the shaft 16 between the bottom of the milk receptacle and the base, and a supply pipe or nozzle 20 projects inwardly through the jacket so as to coöperate with the rotor 19. Thus, steam or any other heated fluid may be admitted into the jacket so as to actuate the rotor and then ascend within the jacket to surround the milk receptacle for heating the same. The steam condenses within the jacket. Thus, the steam or other agent serves the dual function of actuating the apparatus and heating the milk receptacle, it being desirable however, that the temperature of the milk receptacle will be retained below the point of coagulation so as not to destroy the peptogenic properties of the casein or other proteids. Upon the other hand, it is desirable to retain the milk receptacle at a sufficiently high temperature to prevent the milk from buttering as it is agitated.

In order to permit the condensation to pass off, the base 3 is preferably provided with a trap 21, which will permit the condensation to pass off.

The shaft 16 passes through the bottom of the milk receptacle, the bottom being provided with an upstanding packing receiving collar 22 on which is screw-threaded a gland 23. A horizontally rotating agitator 24 is secured to the shaft within the milk receptacle, while a disk or sprayer 25 is secured to the shaft within the casing 8 or above the milk receptacle.

A fan 26 of any suitable character is secured to the shaft above the partition 13 or within the chamber provided by the partition, said fan being rotated by the shaft so as to create an upward current of air through the opening 14 in the partition and outwardly through the exhaust conduit 15. Thus, the rotary fan or centrifugal blower will tend to rarefy the air within the casing 8 and above the milk receptacle, thereby causing air to be drawn in through the openings 11 and 11', which will be drawn upwardly through the casing 8 and around the sprayer or breaker 25 to the rotary fan.

An upstanding eduction pipe 27 is secured to the flange 9 adjoining the wall of the milk receptacle and has its upper end bent to form an angular arm 28 overhanging the sprayer 25. The eduction pipe 27 is preferably arranged adjacent the inlet 11', although its particular locality does not alter its environments.

The milk supply pipe is denoted by the numeral 29, the same entering the casing 8 adjacent its lower end and being attached to the flange 9, preferably below the opening 11 and at a point diametrically opposite the eduction pipe 27.

The milk receptacle 6 is also provided with an outlet spout 30 adjacent its lower end and passing through the jacket 4 and having a discharge or outlet faucet 31.

The apparatus as above described and as illustrated in the drawing will therefore possess the advantages and features pointed out in the introduction, and so combines and revises the apparatus disclosed in the aforesaid patent as to increase the efficiency and utility of the apparatus.

In operation, the supply or feed pipe 29 is connected to a suitable tank or other receptacle containing the milk to be condensed, the flow of milk being regulated or governed by means of any suitable valve, as usual. After the flow of milk has been established, in order to properly fill the milk receptacle, the steam line may be opened so as to admit the steam into the jacket for actuating the rotor and for heating the milk contained in the receptacle to the proper degree to prevent coagulation. Or, if desired, the shaft may be driven by any other suitable power, it not being necessary to employ the rotor, the same running free with the shaft when the latter is driven by a belt or otherwise, and the steam merely being admitted for heating the milk receptacle. When the agitator 24 is rotated with the shaft, the milk within the receptacle will be whirled to form an eddy or a wall of milk around the sides of the milk receptacle, this centrifugal action forcing the milk upwardly under the flange 9. The superincumbent milk will therefore choke or cut off the passage through the supply pipe 29, and the flow of fresh milk into the apparatus will be retarded or arrested, until the desiccating action reduces the quantity of the milk and thereby admits sufficient fresh milk to make up for the loss. The upward thrust of the milk against the flange 9 also forces the milk up the eduction pipe 27 so as to be discharged on the sprayer 25, the milk being broken and thrown from the sprayer thereby to form a foggy or mist like cloud in the casing 8. The steam or water vapor given off by the milk will therefore be drawn off by the centrifugal fan and will be discharged through the exhaust conduit 15, the curd or heavier constituents descending and being directed back into the milk receptacle by means of the flange 9. The air in being drawn through the casing 8 will also aerate the milk as it is undergoing the evaporating or desiccating action. Thus, as the operation progresses, the milk will be condensed, or the water will be evaporated and drawn off; and the quantity of milk within the apparatus being reduced by the desiccating action, will permit fresh milk to flow gradually into the milk receptacle through the feed pipe 29. The milk being thrown against the walls of the milk receptacle by the centrifugal action caused by the rotary agitator 24 will thus prevent the interior exposure of the walls of the milk receptacle so that the incrustation or scorching of the milk is eliminated or eradicated. After the operation or desiccating action has ensued for the proper time so as to sufficiently reduce the milk, which in practice is one third, the rotation of the shaft is stopped, and the condensed milk may be drawn off through the faucet 31. The milk, thus condensed, will be of undiminished solubility and the casein and other proteids will retain their original peptogenic properties.

From the foregoing, taken in connection with the drawing, the advantages and capabilities of the present apparatus will be apparent, it being noted that this apparatus may be employed for condensing or desiccating various other liquids.

Having thus described the invention what is claimed as new is:—

1. In a condenser, a liquid receptacle, a horizontally rotating centrifugal agitator therein, and a liquid supply pipe so attached to the upper end of the receptacle that the influx of liquid will be choked by the centrifugal action of the liquid when the rotating wall of the liquid rises to a predetermined height.

2. In a condenser, a liquid receptacle, a centrifugal agitator therein, a flange overhanging the receptacle, and a liquid supply pipe attached to the said flange in order that the centrifugal action of the liquid within the receptacle will choke the influx of liquid through the supply pipe.

3. In a condenser, a liquid receptacle, a centrifugal agitator therein, a flange overhanging the receptacle and having its inner edge bent downwardly, and a liquid supply pipe attached to the flange.

4. In a condenser, a receptacle, a rotary agitator therein, a flange overhanging the receptacle, a rotary sprayer above the receptacle, and an eduction pipe upstanding from the flange and overhanging the sprayer.

5. In a condenser, a receptacle, a rotary agitator therein, an annular flange overhanging the receptacle, a casing mounted above the receptacle, a rotary sprayer mounted within the casing, an eduction pipe upstanding from the flange and overhanging the sprayer, and means for creating a current of air upwardly through the casing.

6. In a condenser, a receptacle, a rotary agitator therein, a casing mounted on the receptacle and having an inwardly projecting flange at its lower end overhanging the receptacle, the casing having an air inlet, a rotary sprayer within the casing, an eduction pipe upstanding from the flange and overhanging the sprayer, and a rotary fan mounted in the upper end of the casing for rarefying the air within the casing.

7. In a condenser, a liquid receptacle, a centrifugal agitator therein, an annular flange overhanging the receptacle, a rotary sprayer above the receptacle, an eduction pipe upstanding from the flange and overhanging the sprayer, and a liquid supply pipe attached to the flange.

8. In a condenser, a base, a jacket mounted thereon, a receptacle suspended within the jacket, a shaft passing through the bottom of the receptacle, an agitator secured to the shaft within the receptacle, a rotor secured to the shaft between the base and receptacle, and means for supplying a heated fluid to the rotor for actuating the agitator and for heating the receptacle.

9. In a condenser, a base, a jacket supported thereon, a receptacle suspended within the jacket, a casing mounted on the jacket, an upright shaft journaled through the bottom of the receptacle and supported by the base, an agitator secured to the shaft within the receptacle, the casing having an inwardly projecting flange overhanging the receptacle, a sprayer mounted on the shaft within the casing, an eduction pipe upstanding from the flange and overhanging the sprayer, and means for creating a current of air upwardly through the casing.

10. In a condenser, a base, a jacket supported thereon, a receptacle suspended within the jacket, a casing mounted on the jacket, an upright shaft journaled through the bottom of the receptacle and supported by the base, an agitator secured to the shaft within the receptacle, the casing having an inwardly projecting flange overhanging the receptacle, a sprayer mounted on the shaft within the casing, an eduction pipe upstanding from the flange and overhanging the sprayer, means for creating a current of air upwardly through the casing, the casing having air inlets therein, a fan secured to the shaft at the upper end of the casing for rarefying the air within the casing, and a supply pipe attached to the said flange.

11. In a condenser, a base, a jacket supported thereon, a receptacle disposed within the jacket having an upper exterior flange seated on the jacket, a casing having a lower inwardly projecting flange seated on the said flange and overhanging the receptacle, the inner edge of the latter flange being downturned, the casing having air inlets, inwardly opening flap valves for the said inlets, an upright shaft journaled through the bottom of the receptacle and supported by the base, a rotor mounted on the shaft between the base and receptacle, means for supplying a heated fluid to the rotor, a supply pipe connected to the latter flange, a sprayer carried by the shaft within the casing, an eduction pipe upstanding from the latter flange and overhanging the sprayer, a rotary fan secured to the shaft at the upper end of the casing for expelling the air from the casing, and an agitator carried by the shaft within the receptacle.

In testimony that I claim the foregoing as my own, I have hereto affixed my signature in the presence of two witnesses.

SOREN P. HAY.

Witnesses:
LEONA MERK,
WM. E. RICHARDSON.